Patented Aug. 12, 1947

2,425,573

UNITED STATES PATENT OFFICE 2,425,573

SEPARATION OF THORIUM AND THE RARE-EARTH GROUP FROM MINERALS

Frederick Soddy, Enstone, England

No Drawing. Application November 12, 1941, Serial No. 418,848. In Great Britain November 28, 1940

6 Claims. (Cl. 23—19)

This invention relates to the chemical treatment of minerals containing the rare-earth group and thorium, in particular of the rare-earth mineral monazite, by processes in which the rare-earths and thorium are separated as solid sulphates from liquors of sufficient concentration of sulphuric acid.

In the ordinary or regular working up of monazite sand and other phosphatic rare earth minerals, they are broken and the rare-earth content converted into soluble form by heating the minerals with twice their weight of concentrated sulphuric acid. Only about a quarter of this is theoretically necessary to displace the phosphoric acid. The large excess is required to keep the mass fluid enough to stir, and to enable the action to continue as the relatively voluminous rare-earth sulphates crystallize from the heated mass.

The invention depends upon the effect of the phosphoric acid concentration of the liquors in changing the solubility of the contained rare-earth elements and especially upon the prevention of the precipitation of the thorium with the rare-earth sulphates by the presence of sufficient phosphoric acid in the liquors.

The invention has for its general object to provide a process whereby the separation of monazite and other rare-earth minerals into the rare-earths, thorium and meso-thorium, may be effected in an easy manner as a continuous process in which the phosphoric acid and excess sulphuric acid may be used repeatedly and finally recovered as by-products. It has for its particular objects (1) to provide a process for the separation of the rare-earths and the separation of the thorium and the separation of the mesothorium residue in forms suitable for further processes of manufacture; (2) to secure economy in the quantities of sulphuric acid and other materials used in the process and (3) to recover valuable by-products.

In the working up of the phosphatic mineral monazite it is known, cf. British specification No. 189,698, that under suitable conditions as to the concentration of the liquor in sulphuric acid, the rare-earth sulphates crystallise out containing the smaller part and the liquor containing the greater part of the thorium and that from this liquor the contained thorium may be separated in a concentrated form by reconcentrating the acid liquor by heat, whereby the phosphoric acid in the mineral and the unused part of the sulphuric acid can be recovered as a by-product. But it is claimed that the specific effect of the phosphoric acid content of the liquor has not hitherto been recognised and that it has not hitherto been known how entirely to prevent the separation of the thorium with the rare-earth sulphates by increasing the concentration of the liquor in phosphoric acid. Also it has not been previously known that the acid liquors containing a substantial proportion of phosphoric acid recovered by reconcentration may be used instead of fresh sulphuric acid to attack or "break" or decompose fresh mineral, thereby not only providing the sufficiency of phosphoric acid in the liquors to prevent the precipitation of the thorium with the rare-earth sulphates but economising in sulphuric acid and recovering the phosphoric acid as a by-product of enhanced phosphoric acid and diminished sulphuric acid content.

Phosphoric acid also increases the solubility of the less soluble rare-earth elements of the lanthanum type and the thorium concentrate recovered from the liquors by reconcentration contains an increasing proportion of the lanthanum type of earths as the phosphoric acid content is increased. This is of importance in the initial stages also of the process particularly when the recovery of the mesothorium insoluble residue is an object. To obtain this residue in minimum quantity and greatest concentration, it is better to start the process by dissolving the broken monazite sand in sufficient water at one stage to dissolve the soluble constituents, rather than to defer the separation of the unattacked sand and insoluble minerals, such as ilmenite and rutile, and the mesothorium residue to a later stage, or to leach the broken sand with successive quantities of water.

By way of example the invention will be described for monazite sand put into solution and separated from insoluble materials as just described. If we assume that the monazite has been broken according to the known practice of heating the mineral with from one and one-half to twice its weight of concentrated sulphuric acid and water has been added with stirring until the solubilized thorium and rare-earth values have been brought into solution, the resulting solution usually has a volume of around 9 litres per kilogram of monazite sand. When the mineral has been broken with fresh acid used in the proportion of 2 parts by weight of acid to 1 part of the mineral, the ratio of the phosphoric acid to free sulphuric acid present in such solution will be around one to five. The addition to such a solution of a mixture of concentrated phosphoric and sulphuric acids in the same ratio, one to five, insures precipitation of the rare-earth sulphates substantially free from thorium. The quantity of mixed acids necessary depends somewhat on the time-factor, but with this or a higher ratio of phosphoric to sulphuric acid, one-third of the volume of the monazite solution of the mixed concentrated acids is ample to give speedy separation, and no advantage results from increasing it.

The next stage of the process is to wash the precipitated rare-earth sulphates free from the adhering liquor containing thorium and phosphoric acid by diluted sulphuric acid of sufficient concentration not to redissolve the solids and of sufficient dilution not to precipitate the thorium from the liquor, for which purpose a strength around 9-normal, say 450 grams of $H_2SO_4$ per litre, is suitable. This washed precipitate contains by far the greater part of the rare-earths and practically all those of the cerium type in the form of crystalline hydrated sulphates suitable to start the manufacture of rare-earth products such as pure cerium compounds, rare-earth oxides for flame arcs and other uses, and pyrophoric alloys for "flint-and-steel" lighters.

In the final stage, the liquor from the rare-earth sulphate precipitation stage and washings from the immediately preceding stage are reconcentrated by heat to fuming point and the solids deposited separated from the concentrated acid by filtration or centrifugalisation. The solids consist mainly of thorium sulphate or sulpho-phosphate with a smaller proportion of rare-earths of the lanthanum type, in a form well suited for the further manufacture of pure thorium compounds for the gas-mantle industry and other purposes by any known process. The acid liquor separated may be used instead of fresh acids in the first stage for separating the rare-earth sulphates and instead of fresh sulphuric acid to break further quantities of monazite sand. With a fine-grained sand it may be used for the latter purpose until the phosphoric acid to sulphuric acid ratio has been enhanced to at least one to two, and further by using excess of sand and recovering the excess unattacked.

The working up of the mineral may be carried on as a continuous process in which the excess acid liquor containing the phosphoric acid is withdrawn when the phosphoric acid attains a pre-arranged content. On standing in the cold the greater part of any still dissolved solids, such as iron and other impurities, deposits out and may be removed. This liquor is well suited for the preparation of fertilisers or other phosphoric acid derivatives.

Where the manufacture is carried on as a continuous process the fresh sulphuric acid, over and above that used for washing the solids withdrawn, may be added as required to replace that used up in the process at the stage and in the manner most advantageous, as for instance in the retreatment of partially attacked mineral, or in general where a greater ratio of sulphuric to phosphoric acid than is maintained in the cycle is advantageous.

An optimum advantageous ratio of phosphoric to sulphuric acid will be attained when the economy in sulphuric acid consumption and the increased value of the acid concentrate withdrawn from the cycle, due to enhanced phosphoric acid content, is offset by the increasing proportion of lanthanum in the thorium concentrate, the decreasing speed and activity of the acid concentrate in breaking fresh mineral and similar factors. When that is reached the sulphuric acid content is maintained by the addition of fresh sulphuric acid as already described.

It may be pointed out that in the present process the phosphoric acid content of the system is increased which is in contrast with previous proposals in which the tendency has been to eliminate the phosphoric acid. From this several advantages or a number of advantages may be obtained of which attention is drawn to the following, namely:

(a) Separation of the rare-earths from thorium (quite new).

(b) Economy of sulphuric acid, used in breaking the mineral.

(c) Enhanced phosphoric acid content of by-product.

(d) Economy of sulphuric and phosphoric acids in carrying out (a).

(e) Avoiding the formation of large insoluble fractions due to removal of the phosphoric acid from the system.

What I claim is:

1. In a process for the treatment of natural phosphatic minerals containing rare earth elements and thorium the steps of adding phosphoric acid and sulphuric acid of higher concentration to a relatively dilute sulphuric acid solution of a natural phosphatic mineral containing rare earth elements and thorium already containing an amount of phosphoric acid at least chemically equivalent to the amount of phosphate present in the mineral before being brought into solution and thereby causing rare earth sulphates to crystallize out leaving thorium in the form of soluble compounds in solution, and thereafter separating the crystals from the solution.

2. In a process for the treatment of monazite the steps of adding phosphoric acid and sulphuric acid of higher concentration to a relatively dilute sulphuric acid solution of monazite already containing an amount of phosphoric acid at least chemically equivalent to the amount of phosphate present in the monazite before being brought into solution and thereby causing rare earth sulphates to crystallize out leaving thorium in the form of soluble compounds in solution, and thereafter separating the crystals from the solution.

3. A process for the production of rare earth compounds and thorium concentrates from monazite which comprises dissolving monazite in sulphuric acid, then adding water in sufficient amount to bring about solution of the rare earth compounds and thorium adding phosphoric acid and relatively concentrated sulphuric acid to the resulting solution in sufficient quantity and concentration to cause rare earth sulphates to crystallize out substantially free from thorium, separating the rare earth sulphate crystals from the solution, washing the crystals and adhering liquor with diluted sulphuric acid of sufficient concentration not to redissolve the crystals and of sufficient dilution not to precipitate thorium compounds from the adhering liquor, separating the crystals from the washing liquor, combining the washing liquor with the mother liquor, evaporating water from the resulting solution to cause thorium concentrates to deposit from the mixture of concentrated sulphuric and phosphoric acids thus produced, separating the deposited thorium concentrates from the mixture of concentrated acids and dissolving a further quantity of monazite in the mixture of concentrated phosphoric and sulphuric acids so recovered.

4. A process for the separation and recovery of rare earth compounds and thorium concentrates from monazite which comprises dissolving the monazite in sulphuric acid, then adding water in sufficient amount to bring about solution of the rare earth compounds and thorium adding to the resulting solution the mixture of concentrated sulphuric and phosphoric acids recovered from a former treatment of monazite with sulphuric acid by the process claimed in claim 3 to cause rare earth sulphates to crystallize out substantially free from thorium, separating the crystals with adhering liquor from the solution, washing the crystals and adhering liquor with sulphuric acid of approximately 9N concentration, separating the washed crystals from the washing liquor, mixing the washing liquor with the mother liquor from the rare-earth crystallization step, evaporating water from the resulting mixture so that a mixture of concentrated phosphoric and sulphuric acids and solid thorium concentrates is formed, and separating the thorium concentrates from the mixture of concentrated sulphuric and phosphoric acids so produced.

5. The process of recovering rare earth elements substantially free from thorium from sulphuric acid solutions containing admixtures of salts of said elements and thorium in solution which comprises increasing the concentration of sulphuric acid in such a solution sufficiently to insure precipitation of salts of the rare earth elements while providing sufficient phosphoric acid in said solution to inhibit precipitation of thorium salts therefrom and thereafter separating the precipitated rare earth salts from the remaining solution.

6. The process of recovering rare earth elements substantially free from thorium from a solution of a relatively dilute sulphuric acid phosphatic mineral containing rare earth elements and thorium already containing an amount of phosphoric acid at least chemically equivalent to the amount of the phosphate in the mineral before being brought into solution, which comprises increasing the concentration of sulphuric acid in said solution sufficiently to insure precipitation of salts of the rare earth elements, adding sufficient phosphoric acid to inhibit precipitation of thorium salts along with said rare earth salts, and separating the precipitated rare earth salts from the solution.

FREDERICK SODDY.

REFERENCES CITED

The following references are of record in the file of this patent:

UNITED STATES PATENTS

| Number | Name | Date |
| --- | --- | --- |
| 1,100,743 | Keetman | June 23, 1914 |
| 1,351,489 | Ryan | Aug. 31, 1920 |
| 1,371,741 | Dietsche | Mar. 15, 1921 |
| 1,069,959 | Koss | Aug. 12, 1913 |

FOREIGN PATENTS

| Number | Country | Date |
| --- | --- | --- |
| 527,089 | Great Britain | Oct. 2, 1940 |
| 189,698 | Great Britain | Dec. 7, 1922 |

OTHER REFERENCES

"The Metals of the Rare Earths," by J. F. Spencer, Longmans, Green & Co., New York (1919), p. 183.

"Chemistry of the Rarer Elements," by Hopkins, D. C. Heath and Co., New York (1923), p. 182.

Certificate of Correction

Patent No. 2,425,573.                                              August 12, 1947.

FREDERICK SODDY

It is hereby certified that error appears in the printed specification of the above numbered patent requiring correction as follows: Column 6, line 2, claim 6, for the words "solution of a relatively dilute sulphuric acid" read *a relatively dilute sulphuric acid solution of a*; and that the said Letters Patent should be read with this correction therein that the same may conform to the record of the case in the Patent Office.

Signed and sealed this 21st day of October, A. D. 1947.

[SEAL]

THOMAS F. MURPHY,
*Assistant Commissioner of Patents.*